(12) United States Patent
Urashita

(10) Patent No.: US 10,133,963 B2
(45) Date of Patent: Nov. 20, 2018

(54) VIDEO MONITORING APPARATUS, CONTROL APPARATUS, CONTROL METHOD, AND NON-TRANSITORY READABLE STORAGE MEDIUM

(71) Applicant: NEC Corporation, Tokyo (JP)

(72) Inventor: Keiichi Urashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 14/840,418

(22) Filed: Aug. 31, 2015

(65) Prior Publication Data

US 2016/0080700 A1 Mar. 17, 2016

(30) Foreign Application Priority Data

Sep. 16, 2014 (JP) .................................. 2014-187186

(51) Int. Cl.
*G06K 9/66* (2006.01)
*G06K 9/00* (2006.01)
*H04N 7/18* (2006.01)
*G08B 13/196* (2006.01)

(52) U.S. Cl.
CPC .......... *G06K 9/66* (2013.01); *G06K 9/00771* (2013.01); *G08B 13/19615* (2013.01); *H04N 7/188* (2013.01)

(58) Field of Classification Search
CPC .......... G08B 21/0476; G08B 13/19608; G08B 21/22; G08B 13/00; G08B 13/19645; G08B 13/19647; H04N 7/188; G06K 9/00771
See application file for complete search history.

(56) References Cited

U.S. PATENT DOCUMENTS

| 6,970,083 B2 | 11/2005 | Venetianer et al. |
| 2004/0105570 A1 | 6/2004 | Venetianer et al. |
| 2006/0222206 A1 | 10/2006 | Garoutte |
| 2008/0100704 A1 | 5/2008 | Venetianer |
| 2008/0247609 A1 | 10/2008 | Feris |
| 2010/0026802 A1 | 2/2010 | Titus |
| 2010/0201815 A1 | 8/2010 | Anderson |
| 2011/0169637 A1* | 7/2011 | Siegler, II .......... G08B 13/2494 340/541 |

(Continued)

FOREIGN PATENT DOCUMENTS

| JP | 2007-512738 | 5/2007 |
| JP | 2008-047074 | 2/2008 |
| JP | 2011-176736 | 9/2011 |

(Continued)

OTHER PUBLICATIONS

Singapore Search Report dated Feb. 17, 2016; Appln. No. 10201507691Y.

(Continued)

*Primary Examiner* — Obafemi O Sosanya
(74) *Attorney, Agent, or Firm* — Young & Thompson

(57) ABSTRACT

A control apparatus of the present invention includes a first detection circuit which detects a first event which satisfies a first condition from a video, a second detection circuit which detects a second event which satisfies a second condition from the video, and a determination circuit which determines whether the first event and the second event satisfy some logical relationship or not, on based on a detected result of the first event and the second event.

19 Claims, 7 Drawing Sheets

(56) References Cited

U.S. PATENT DOCUMENTS

2013/0216107 A1* 8/2013 Huang .............. G06K 9/00295
382/118

FOREIGN PATENT DOCUMENTS

| | | |
|---|---|---|
| JP | 2012-208793 | 10/2012 |
| JP | 2014-123276 | 7/2014 |

OTHER PUBLICATIONS

Japanese Office Action dated Aug. 21, 2018 in corresponding Japanese Patent Application No. 2014-187186 with JPO machine translation of Japanese Office Action.

* cited by examiner

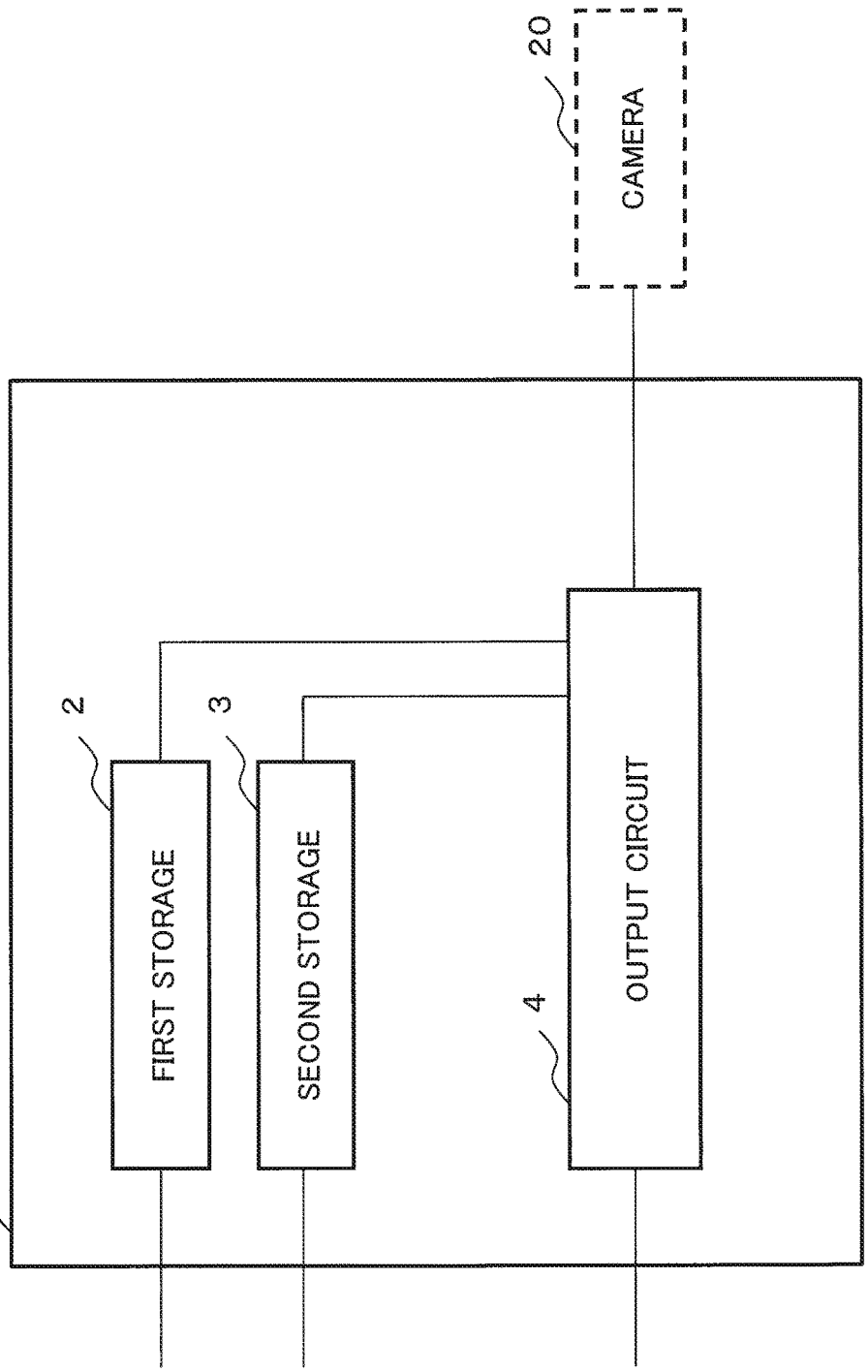

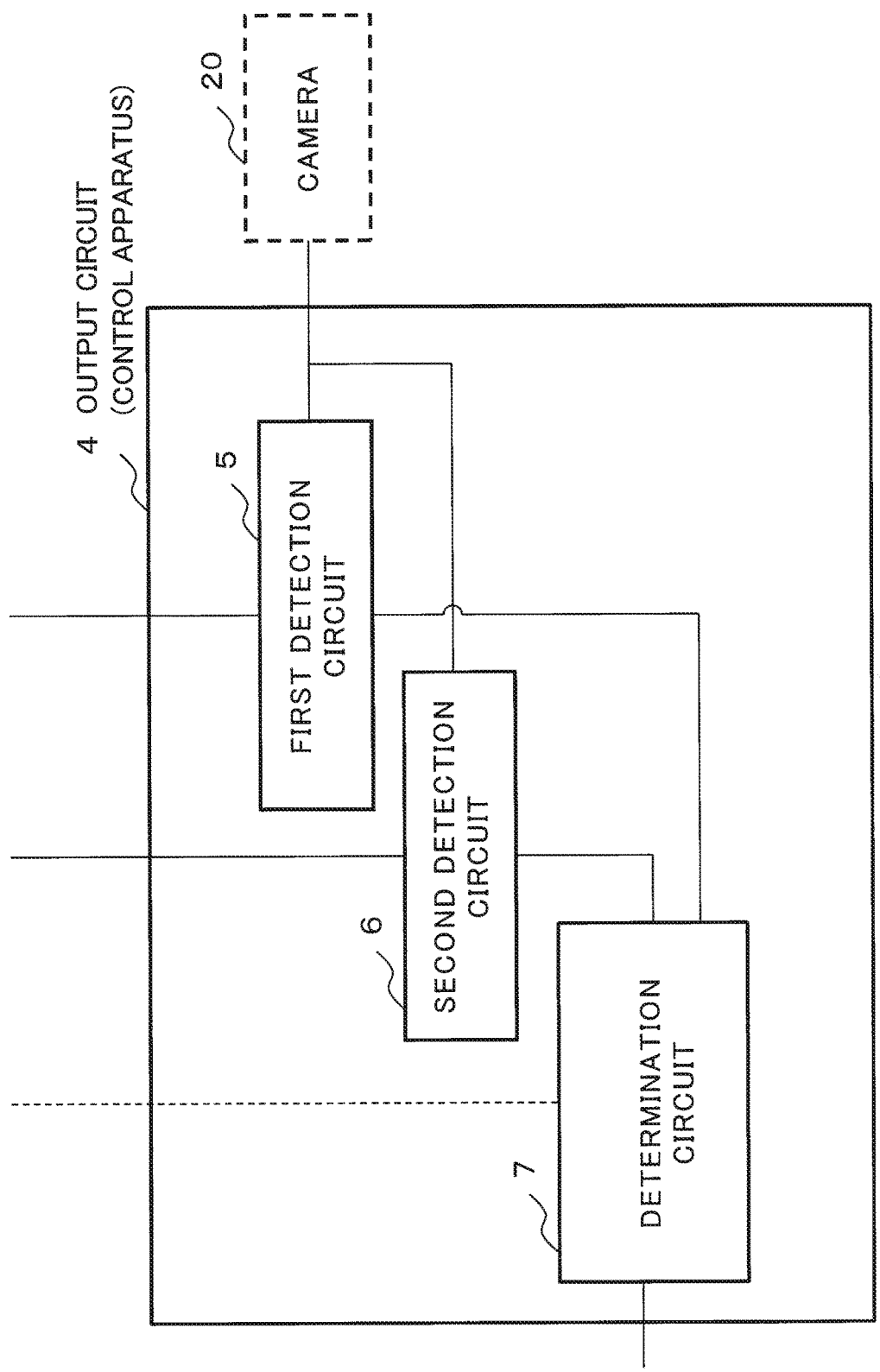

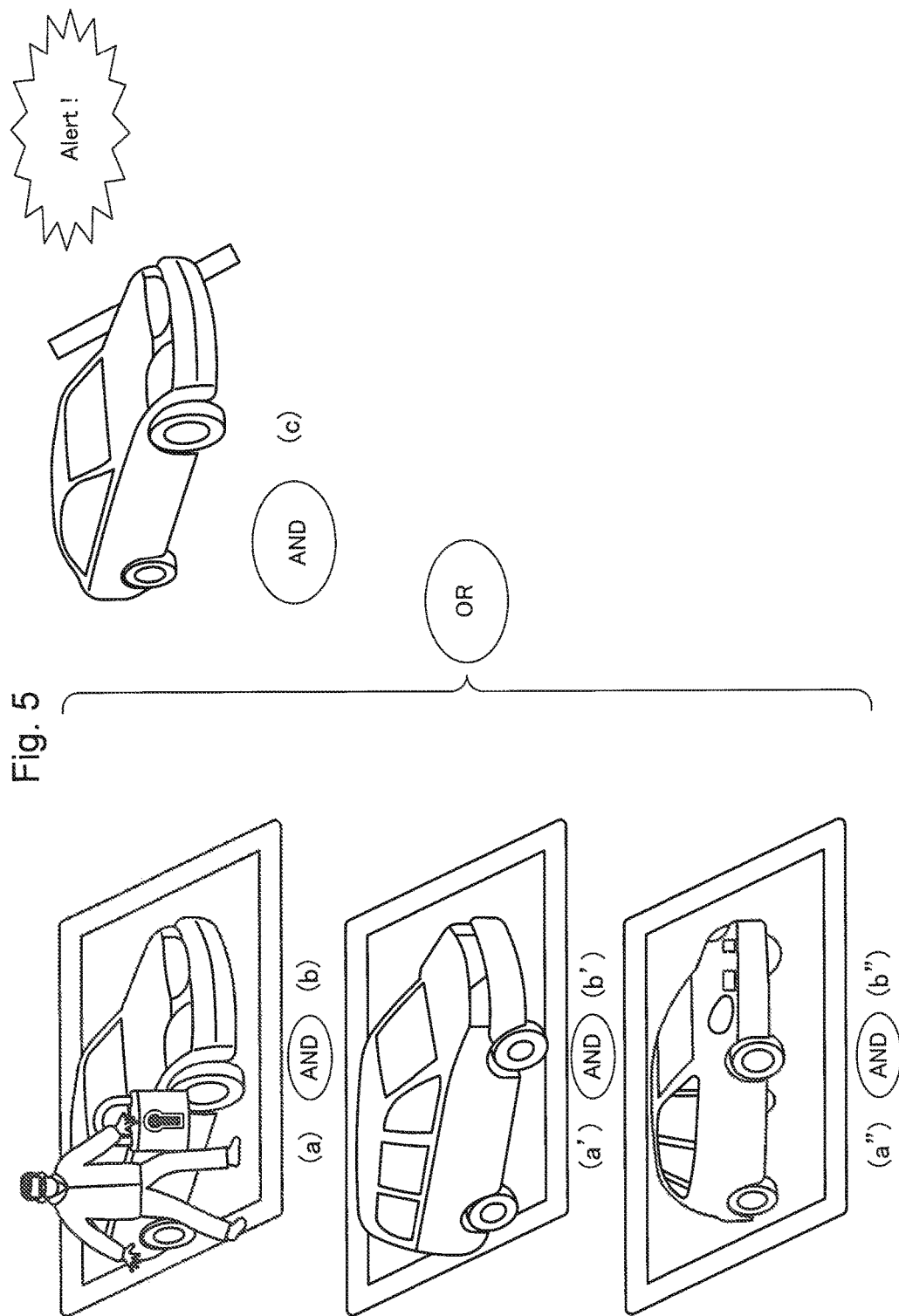

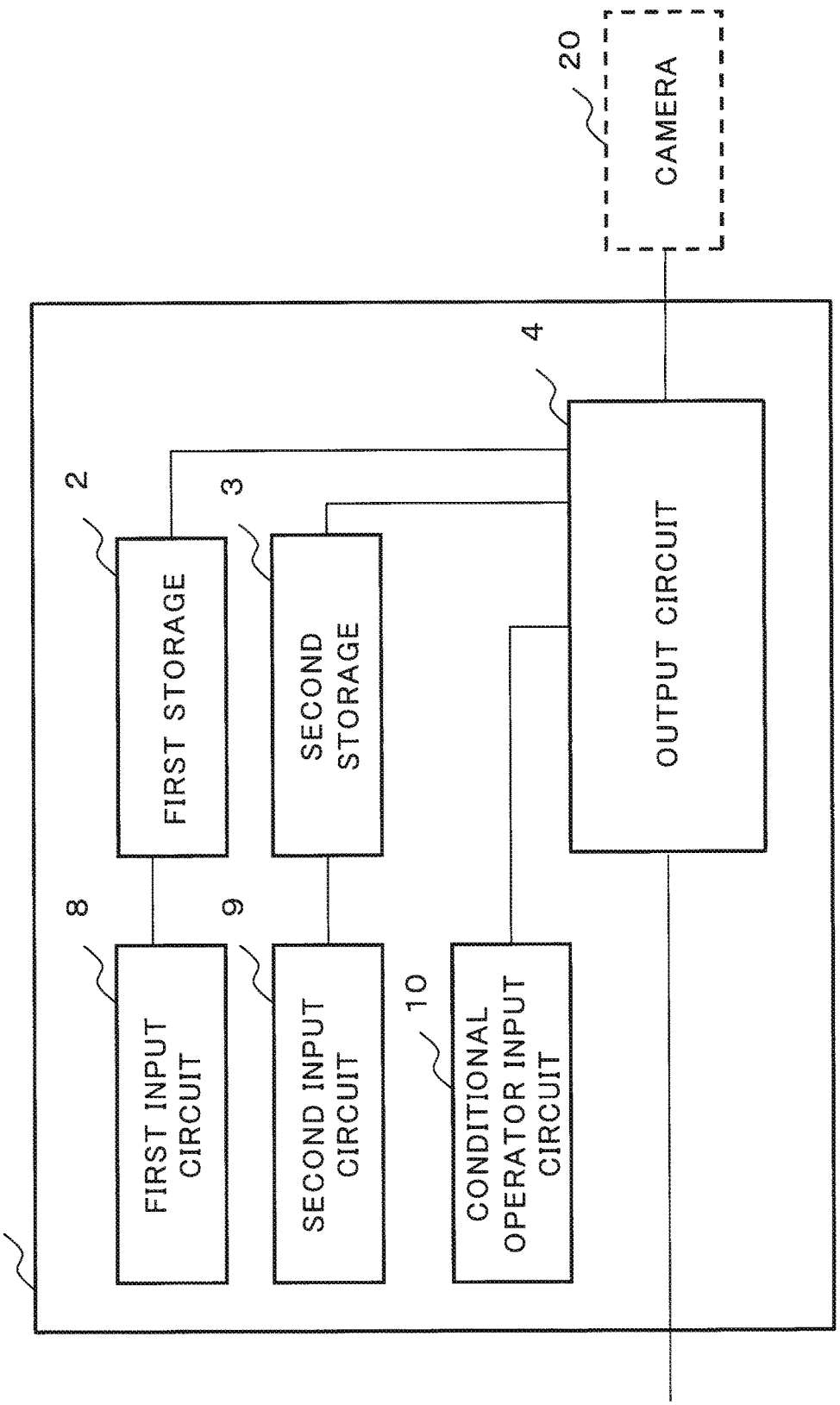

Fig. 7B (AREA 12 WHERE FIRST CONDITION IS DISPLAYED) * (AREA 13 WHERE SECOND CONDITION IS DISPLAYED)

VIDEO MONITORING APPARATUS, CONTROL APPARATUS, CONTROL METHOD, AND NON-TRANSITORY READABLE STORAGE MEDIUM

This application is based upon and claims the benefit of priority from Japanese Patent Application No. 2014-187186, filed on Sep. 16, 2014, the disclosure of which is incorporated herein in its entirety by reference.

TECHNICAL FIELD

The present invention relates to a video analysis technology, and more particularly, relates to a technology for detecting abnormal behavior.

BACKGROUND ART

Electric power generation plants, communication facilities, water supply facilities, airports, oil plant, and the like are important facilities in the urban foundation. When such important facilities fail to function, the adverse effect on the society is enormous. For this reason, it is required to strictly protect the important facilities. In one of methods for protecting the important facilities, a video analysis system is used to cause a computer to analyze video data captured by a monitoring camera, recognize moving objects (person, car, suspicious object, and the like) in the video, and monitor the flows of the moving objects (travelling direction, movement line, behavior, and the like). In general, in a video analysis system using a computer, a user defines an abnormal status in advance, so that the abnormal status defined from target video data is detected.

An example of such video analysis system using the computer is described in patent document 1 (Japanese Patent Application Laid-Open No. 2008-047074). It is an object of the invention described in patent document 1 to provide a guard apparatus, a guard method, and a guard program capable of determining a suspicious individual in an area where a family member or a visitor may be detected, and capable of giving warning to only the suspicious individual. The guard apparatus described in patent document 1 includes a behaving person detection unit, a detection area determination unit, a suspicious individual determination unit, a speaker, and an indicating lamp. The behaving person detection unit detects a behaving person on the basis of image information captured by the monitoring camera and reference image information stored in the reference image storage unit. The detection area determination unit determines which detection area of the detection areas the behaving person has been detected, on the basis of the behaving person detected by the behaving person detection unit and the detection area stored in the detection area data base. The suspicious individual determination unit determines whether the behaving person is the suspicious individual or not on the basis of the detection area detected by the detection area determination unit. A speaker and an indicating lamp notify existence of the suspicious individual in a case where the behaving person is determined to be the suspicious individual.

SUMMARY

The guard apparatus described in Patent document 1 explained above cannot do things other than detection of simple behavior such as crossing of a prohibited line, entry into a prohibited area, and the like. On the other hand, in recent years, it is desired to detect more complicated behavior such as break-opening a key and then enter thereinto.

An exemplary object of the present invention is to provide a video analysis technology capable of detecting complicated behavior from a video.

A video monitoring apparatus according to exemplary aspect of the present invention includes a first storage which stores a first condition for detecting a first event from a video, a second storage which stores a second condition for detecting a second event from the video, and a output circuit which outputs a signal indicating that a logical relationship designated in advance by the first event and the second event is satisfied.

A control apparatus according to exemplary aspect of the present invention includes a first detection circuit which detects a first event which satisfies a first condition from a video, a second detection circuit which detects a second event which satisfies a second condition from the video, and a determination circuit which determines whether the first event and the second event satisfy some logical relationship or not, based on a detected result of the first event and the second event.

A control method according to exemplary aspect of the present invention includes detecting a first event which satisfies a first condition from a video, detecting a second event which satisfies a second condition from the video, and determining whether the first event and the second event satisfy some logical relationship or not, on basis of a detected result of the first event and the second event.

A non-transitory readable storage medium storing a control program enables a computer to implement according to exemplary aspect of the present invention includes detecting a first event which satisfies a first condition from a video, detecting a second event which satisfies a second condition from the video, and determining whether the first event and the second event satisfy some logical relationship or not, on basis of a detected result of the first event and the second event.

According the video analysis technology of the present invention, complicated behavior can be detected from a video.

BRIEF DESCRIPTION OF THE DRAWINGS

FIG. 1 is a figure illustrating a configuration of a video monitoring apparatus according to a first embodiment of the present invention.

FIG. 3 is a figure illustrating a configuration of a output circuit according to the first embodiment of the present invention.

FIG. 5 is a figure for explaining detection of a higher-level condition according to the first embodiment of the present invention.

FIG. 6 is a figure illustrating a configuration of the video monitoring apparatus according to a second embodiment of the present invention.

FIG. 7B is an example of an operation screen of the first input circuit, the second input circuit, and the conditional operator input circuit according to the second embodiment of the present invention.

EXEMPLARY EMBODIMENT

Figure 2A:
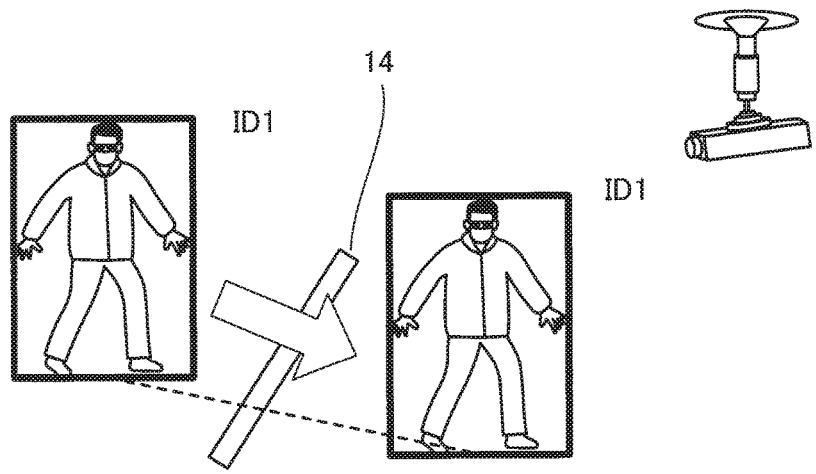
FIG. 2A is a figure for explaining "behavior information about a moving object in a monitoring area" which is an example of a first condition and a second condition according to the first embodiment of the present invention.

Embodiments of the present invention will be hereinafter explained in details with reference to drawings. In the following explanation, those having the same functions are denoted with the same reference numerals, and the explanation thereabout may be omitted.

FIG. 1 is a figure illustrating a configuration of a video monitoring apparatus according to a first embodiment of the present invention. The video monitoring apparatus 1 includes at least a first storage 2, a second storage 3, and an output circuit 4.

The first storage 2 stores a first condition for detecting a first event from a video obtained from an external camera 20 and the like. The second storage 3 stores a second condition for detecting a second event from the video obtained from the external camera 20 and the like. In these first condition and second condition, a user can set any given condition in advance. Examples of the first condition and the second condition include behavior information about a moving object in a monitoring area (an intrusion prohibited area, a border/intrusion prohibited line thereof, and the like), the name of person, age, sex, license plate number, the type of car, color information, weather information, time, ON/OFF information given from another system, and the like. The output circuit 4 outputs a signal indicating that the first event and the second event satisfy a logical relationship designated in advance. Examples of logical relationships include operators such as AND, OR, NOR, THEN, NAND, XOR, and the like. These operators are expressed as conditional operators in the present invention.

A conditional operator AND means that, when both of a first signal and a second signal are true, the output circuit 4 determines that the logical relationship has been satisfied. A conditional operator OR means that, when any one of the first signal and the second signal is true, the output circuit 4 determines that the logical relationship has been satisfied. A conditional operator NOR means that, when both of the first signal and the second signal are false, the output circuit 4 determines that the logical relationship has been satisfied. A conditional operator THEN means that, when the first signal becomes true and thereafter the second signal becomes true, the output circuit 4 determines that the logical relationship has been satisfied. A conditional operator NAND means that, when any one of the first signal and the second signal is false, the output circuit 4 determines that the logical relationship has been satisfied. A conditional operator XOR means that, when any one of the first signal and the second signal is true and the other of the first signal and the second signal is false, the output circuit 4 determines that the logical relationship has been satisfied.

Figure 2B:
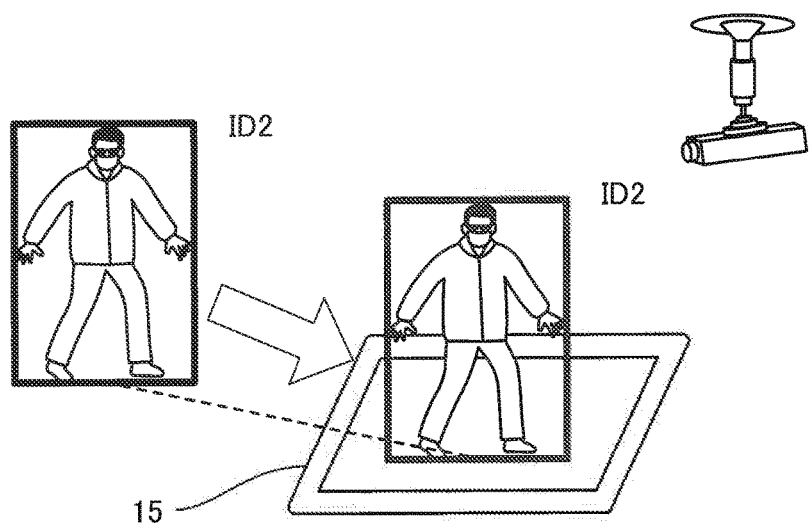
FIG. 2B is a figure for explaining "behavior information about a moving object in a monitoring area" which is an example of a first condition and a second condition according to the first embodiment of the present invention.

FIG. 2A and FIG. 2B are a figure for explaining "behavior information about the moving object in the monitoring area" which is an example of the first condition and the second condition according to the first embodiment of the present invention. The behavior information about the moving object in the monitoring area (an intrusion prohibited area, a border/intrusion prohibited line thereof, and the like) means that a moving object (ID1) passes any given line designated in advance by the user (line 14) in a video (FIG. 2A), a moving object (ID2) enters into any given area designated in advance by the user (area 15) in a video (FIG. 2B), or a moving object moves out of the area (area 15). For example, the behavior information means that "a person crosses the line set on a fence", and "a person enters into an area set on a particular area". In addition, when the moving object stays in the area (area 15) for a certain period of time or longer, this is also included in the behavior information about the moving object in the monitoring area.

The name of a person, the age, and the sex are information about the person detected in a video, and for example, Mr. A (the name of the person), 20 years old (age), male (sex), and the like. The license plate number and the type of car are information about a vehicle detected in the video, and for example, Shinagawa 330 A 1234 (license plate number), a large-size car (the type of car), and the like. The color information is information about the vehicle and the person detected in the video, and for example, yellow jacket (color information about the person), black body (color information about the vehicle), and the like. Such information can be retrieved with processing for, e.g., retrieving a feature quantity of a moving object detected from a video as information stored in a database associated with a feature quantity by collating the feature quantity with the database prepared outside and the like.

The weather information is information such as weather, temperature, and the like, and for example, rain (weather), 30 degrees Celsius (temperature), and the like. The time is information about a time zone when the video was captured, and for example, 12:00 to 13:00, and the like. The weather information and the time can be retrieved with processing for, e.g., retrieving the feature quantity of the moving object detected from the video as information stored in the database associated with the feature quantity by collating the feature quantity with the database prepared outside and the like. Alternatively, the weather information and the time can also be obtained from those other than the video. The ON/OFF information from another system is information about ON and OFF obtained from the outside.

FIG. 3 is a figure illustrating a configuration of the output circuit according to the first embodiment of the present invention. The output circuit 4 includes at least a first detection circuit 5, a second detection circuit 6, and a determination circuit 7.

The first detection circuit 5 uses the first condition to detect the first event from the video obtained from the external camera 20 and the like, and outputs the first signal indicating whether the video has satisfied the first condition or not. The second detection circuit 6 uses the second condition to detect the second event from the video obtained from the external camera 20 and the like, and outputs the second signal indicating whether the video has satisfied the second condition or not. The determination circuit 7 receives the first signal and the second signal, and based on the true/false of the first signal and the true/false of the second signal, determines whether a logical relationship designated in advance has been satisfied or not. Further, when the determination circuit 7 determines that the logical relationship is satisfied, the determination circuit 7 outputs a signal indicating that a logical relationship designated in advance has been satisfied.

Alternatively, a control apparatus may be provided in place of the output circuit 4, The control apparatus includes the first detection circuit which detects the first event which satisfies the first condition, the second detection circuit which detects the second event which satisfies the second condition, and the determination circuit which determines whether the first event and the second event satisfy the logical relationship or not on the basis of a detection of the first event and the second event may be substituted for the output circuit 4.

According to the present embodiment, different conditions are set in the first condition and the second condition, and a high-level condition can be set by combining the conditions with a conditional operator. In addition, complicated behavior can be detected according to a use of the high-level condition.

Figure 4A:
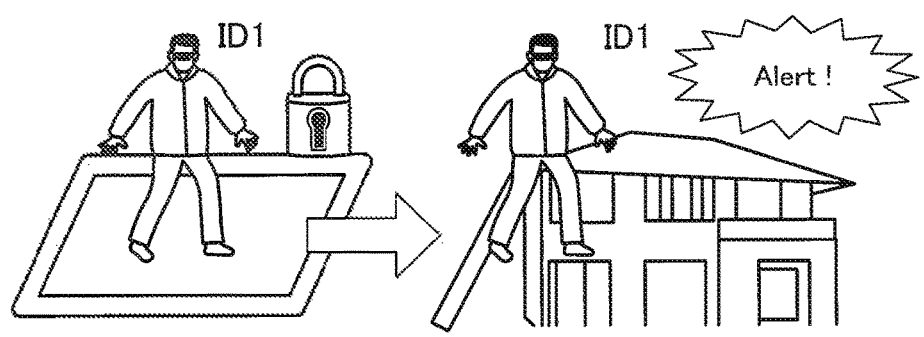
FIG. 4A is a figure for explaining detection of a high-level condition according to the first embodiment of the present invention.
Figure 4B:
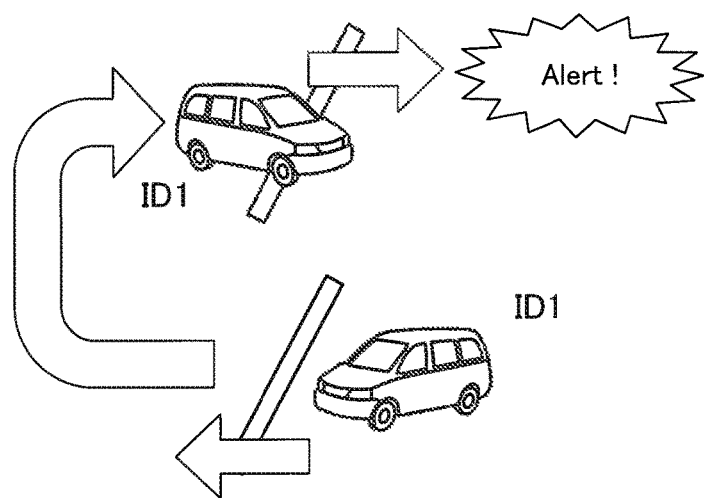
FIG. 4B is a figure for explaining detection of a high-level condition according to the first embodiment of the present invention.

FIG. 4A and FIG. 4B are a figure for explaining detection of complicated behavior according to the first embodiment of the present invention. For example, when "staying in front of a door for 60 minutes or more (behavior information about a moving object in a monitoring area)" and "entering forcibly through the door (behavior information about a moving object in a monitoring area)" are combined with the conditional operator THEN, a thief (ID1) staying in front of the door for a while to unlock the key and forcibly enter into a house after unlocking can be detected (FIG. 4A). When "passing a road westbound (behavior information about a moving object in a monitoring area)" and "passing a road eastbound (behavior information about a moving object in a monitoring area)" are combined with the conditional operator THEN, a vehicle making a U-turn can be detected (FIG. 4B).

Further, multiple conditions are set and these multiple conditions are combined with a conditional operator, so that a higher-level condition can be set. Moreover, more complicated behavior can be detected by using a higher-level condition.

FIG. 5 is a figure for explaining detection of complicated behavior according to the first embodiment of the present invention. For example, a high-level condition made by combining "(a) staying of a person in a surrounding area of a vehicle A (behavior information about a moving object in a monitoring area)" and "(b) moving out of the vehicle A from the surrounding of the vehicle A (behavior information about a moving object in a monitoring area)" with the conditional operator AND is set. In addition, with regard to a vehicle B, high-level conditions are likewise set, by combining "(a') staying of a person in a surrounding area of the vehicle B", and "(b') moving out of the vehicle B from the surrounding area of the vehicle B" with the conditional operator AND is set. Further, with regard to a vehicle C, the high-level condition is likewise set, by combining "(a")staying of a person in a surrounding area of the vehicle C", and "(b")moving out of the vehicle C from the surrounding area of the vehicle C" with the conditional operator AND is set. Then these high-level condition are combined with the conditional operator OR, and further, "(c) passing the exit line of the vehicle (behavior information about a moving object in a monitoring area)" is combined with the conditional operator AND, that is "{[(a) AND (b)] OR [(a') AND (b')] OR [(a") AND (b")]} AND (c)." Therefore, theft of the vehicle, who has stayed around one of multiple vehicles to unlock the door, thereafter takes the vehicle away, and moves out of the compound, can be detected (FIG. 5).

More specifically, according to the present embodiment, complicated behavior can be detected by decomposing the behavior into multiple simple behaviors and other features. A higher-level detection can be done by setting three or more conditions.

FIG. 6 is a figure illustrating a configuration of the video monitoring apparatus according to the second embodiment of the present invention. In the second embodiment, the video monitoring apparatus includes not only the configuration of the first embodiment but also further a first input circuit 8, a second input circuit 9, and a conditional operator input circuit 10. The first input circuit 8 receives input information of the first condition. The second input circuit 9 receives input information of the second condition. The conditional operator input circuit 10 receives a conditional operator indicating a logical relationship of the first condition and the second condition.

The first input circuit 8 stores the received first condition to the first storage 2. The second input circuit 9 stores the received second condition into the second storage 3. The conditional operator input circuit 10 supplies the received conditional operator to the determination circuit 7 provided in the output circuit 4.

The first input circuit 8 and the second input circuit 9 may be integrally configured, and the received input content may be switched by operation. Further, the first input circuit 8, the second input circuit 9, and the conditional operator input circuit 10 may be integrally configured, and the received input content may be switched by operation.

Figure 7A:
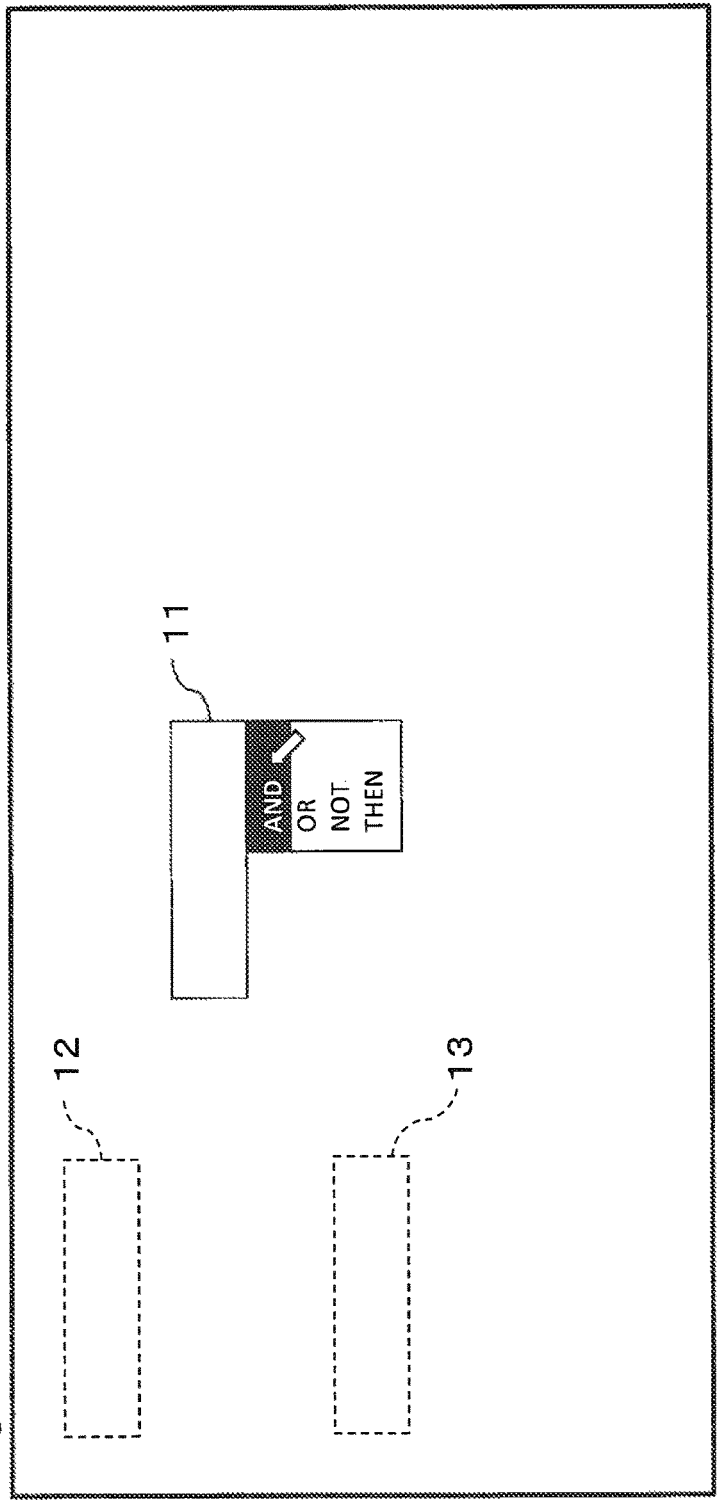
FIG. 7A is an example of an operation screen of a first input circuit, a second input circuit, and a conditional operator input circuit according to the second embodiment of the present invention.

FIG. 7A and FIG. 7B are an example of an operation screen provided in the conditional operator input circuit according to the second embodiment of the present invention. As shown in FIG. 7A, for example, the user selects a conditional operator input area 11 with mouse operation, touch panel operation, keyboard operation, and the like, so that input candidates of conditional operators appears. Further, the user selects any one of the input candidates, so that the conditional operator input circuit 10 receives the selected conditional operator as an input. The conditional operator input circuit 10 displays the selected conditional operator on the conditional operator input area 11. Thus, the input of the conditional operator is completed.

On the operation screen provided on the conditional operator input circuit 10, an area 12 displaying the first condition and an area 13 displaying the second condition may be provided. Therefore, the user can select a conditional operator while confirming an input condition. Further, the user may select the area 12 displaying the first condition or the area 13 displaying the second condition, thus receiving an input of the first condition and the second condition.

Alternatively, the input of the conditional operator may be character-input using a keyboard and the like. The conditional operator may be expressed as a sign. For example, AND may be defined in advance to be expressed as "*", OR may be defined in advance to be expressed as "+", NOR may be defined in advance to be expressed as "#", THEN may be defined in advance to be expressed as ",", and the like. Therefore, the user can easily perform the input of the conditional operator by performing character input using a keyboard and the like.

As shown in FIG. 7B, the input of the conditional operator may be in a format of a search expression. At this occasion, the first condition and the second condition may be input within the search expression. Alternatively, the first condition and the second condition may be separately input, and the reference destination of the separately input condition may be input within the search expression.

According to the present embodiment, complicated behavior can be detected by decomposing the behavior into multiple simple behaviors and other features. According to the present embodiment, the user can easily perform the input of the conditional operator by performing character input using a keyboard and the like.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable non transitory storage medium providing program code for use by or in connection with a computer or any instruction execution system. A computer-usable or computer-readable non transitory storage medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

The present invention is not limited to the above embodiments, and various modifications can be made within the scope of the invention described in the claims, and it is to be understood that these are included within the scope of the present invention.

| | |
|---|---|
| 1 | video monitoring apparatus |
| 2 | first storage |
| 3 | second storage |
| 4 | output circuit |
| 5 | first detection circuit |
| 6 | second detection circuit |
| 7 | determination circuit |
| 8 | first input circuit |
| 9 | second input circuit |
| 10 | conditional operator input circuit |
| 11 | conditional operator input area |
| 12 | area where first condition is displayed |
| 13 | area where second condition is displayed |
| 14 | line |
| 15 | area |
| 20 | camera |

The invention claimed is:

1. A video monitoring apparatus comprising:
a first storage which stores a first condition for detecting a first event from a video;
a second storage which stores a second condition for detecting a second event from the video;
an output circuit which outputs a signal indicating that a logical relationship designated in advance by the first event and the second event is satisfied;
a first input circuit which receives an input of the first condition;
a second input circuit which receives an input of the second condition; and
a conditional operator input circuit which receives an input of a conditional operator indicating the logical relationship.

2. The video monitoring apparatus according to claim 1, wherein the output circuit includes a determination circuit that receives a first signal indicating whether or not the video satisfies the first condition and a second signal indicating whether or not the video satisfies the second condition, and determines whether the logical relationship is satisfied or not by using true or false of the first signal and true or false of the second signal.

3. The video monitoring apparatus according to claim 2, wherein when both of the first signal and the second signal are true, the determination circuit determines that the logical relationship is satisfied.

4. The video monitoring apparatus according to claim 2, wherein when any one of the first signal and the second signal is true, the determination circuit determines that the logical relationship is satisfied.

5. The video monitoring apparatus according to claim 2, wherein when both of the first signal and the second signal are false, the determination circuit determines that the logical relationship is satisfied.

6. The video monitoring apparatus according to claim 2, wherein when the first signal becomes true and thereafter the second signal becomes true, the determination circuit determines that the logical relationship is satisfied.

7. The video monitoring apparatus according to claim 1, wherein the first condition and the second condition are different conditions.

8. The video monitoring apparatus according to claim 1, wherein the first condition or the second condition is information that can be obtained from the video.

9. The video monitoring apparatus according to claim 1, wherein the first condition or the second condition a fact that a moving object passes a line designated in advance in the video.

10. The video monitoring apparatus according to claim 1, wherein the first condition or the second condition is a fact that a moving object passes a line designated in advance in a particular direction in the video.

11. The video monitoring apparatus according to claim 1, wherein the first condition or the second condition is related to a time for which a moving object stays in an area designated in advance in the video.

12. The video monitoring apparatus according to claim 1, wherein the first condition or the second condition is age or sex information.

13. The video monitoring apparatus according to claim 1, wherein the conditional operator input circuit includes an operation screen, and the operation screen includes an area displaying the conditional operator.

14. A control apparatus comprising:
a first detection circuit which detects a first event which satisfies a first condition from a video;
a second detection circuit which detects a second event which satisfies a second condition from the video; and
a determination circuit which determines whether the first event and the second event satisfy some logical relationship or not, based on a detected result of the first event and the second event;
a first input circuit which receives an input of the first condition;
a second input circuit which receives an input of the second condition; and
a conditional operator input circuit which receives an input of a conditional operator indicating the logical relationship.

15. A control method comprising:
receiving an input of a first condition;
receiving an input of a second condition;

receiving an input of a conditional operator indicating a logical relationship of a first event in relation to a second event;

detecting the first event which satisfies the first condition from a video;

detecting the second event which satisfies the second condition from the video; and determining whether the first event and the second event satisfy the logical relationship or not, based on a detected result of the first event and the second event.

16. A non-transitory readable storage medium storing a control program that enables a computer to implement:

receiving an input of a first condition;

receiving an input of a second condition;

receiving an input of a conditional operator indicating a logical relationship of a first event in relation to a second event;

detecting the first event which satisfies the first condition from a video;

detecting the second event which satisfies the second condition from the video; and determining whether the first event and the second event satisfy the logical relationship or not, based on a detected result of the first event and the second event.

17. The video monitoring apparatus according to claim 1, wherein the first event is an event that a person stays in front of a door for a predetermined time, the second event is an event that the person enters at the door, and the logical relationship is a relationship that the second event occurs after the first event occurs.

18. The video monitoring apparatus according to claim 1, wherein the first event is an event that a moving object passes through a road in a specific direction, the second event is an event that the moving object passes through the road in a direction opposite to the specific direction, and the logical relationship is a relationship that the second event occurs after the first event occurs.

19. The video monitoring apparatus according to claim 1, wherein the first input circuit, the second input circuit, and the conditional operator input circuit are integrally formed, whereby the received input content is switched by operation.

* * * * *